MICROSCOPIC PHOTOGRAPH SHOWING DISTRIBUTION OF
DIFFUSION-PENETRATION LAYER FROM SURFACE TO CORE
MAGNIFICATION: x 100   ETCHANT: 5% NITAL

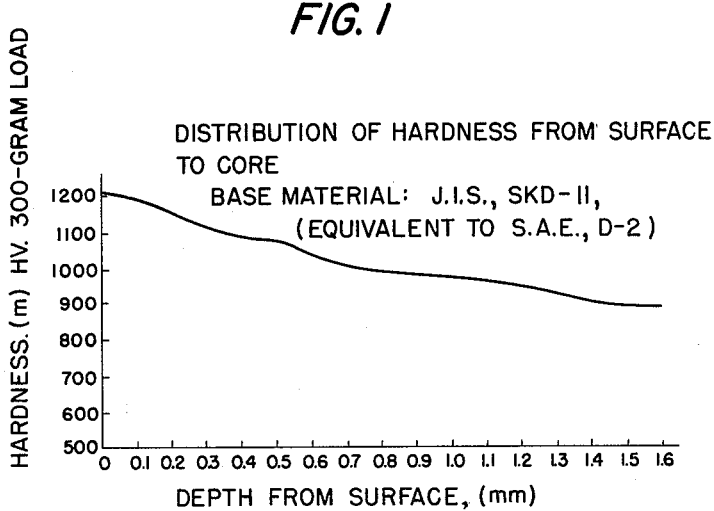
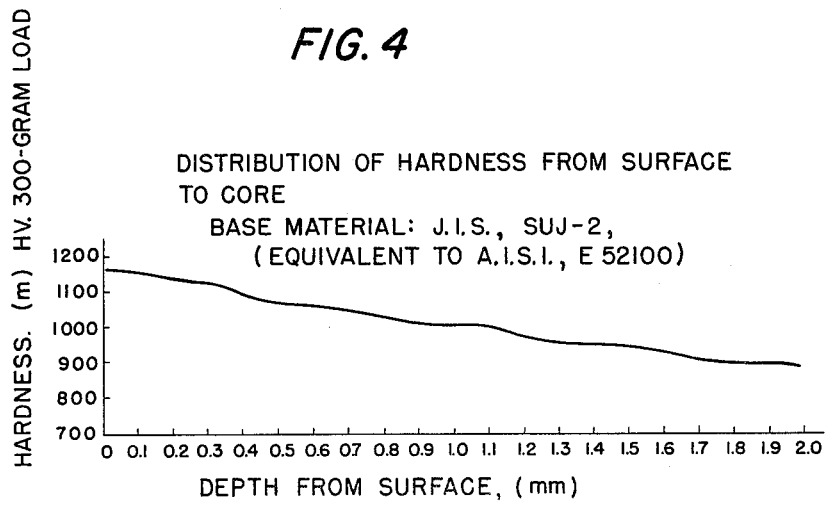

MICROSCOPIC PHOTOGRAPH SHOWING DISTRIBUTION OF
DIFFUSION-PENETRATION LAYER FROM SURFACE TO CORE
MAGNIFICATION: x 100   ETCHANT: 5% NITAL

SURFACE
HARDNESS: (m)HV1100

CORE
HARDNESS: (m)HV930

MICROSCOPIC PHOTOGRAPHS SHOWING STRUCTURES
OF SURFACE AND CORE
MAGNIFICATION: x 400   ETCHANT: 5% NITAL

SURFACE
HARDNESS: (m)HV 1268-1311

CORE
HARDNESS: (m)HV 756-771

MICROSCOPIC PHOTOGRAPHS SHOWING STRUCTURES
OF SURFACE AND CORE
MAGNIFICATION: x400   ETCHANT: 5% NITAL

United States Patent Office 3,155,548
Patented Nov. 3, 1964

3,155,548
PENETRATION HARDENING TREATMENT FOR IRON AND STEELS
Katsuyo Ashikari, 74 1-chome, Higashita-Machi, Suginami-ku, and Kishichi Tanabe, 2557 2-chome, Koiwa-Machi, Edogawa-ku, both of Tokyo-to, Japan
Filed Oct. 30, 1961, Ser. No. 148,503
Claims priority, application Japan, Oct. 11, 1961, 36,247/61
2 Claims. (Cl. 148—13.1)

This invention relates to techniques for treating metals, particularly iron and its alloys, so as to impart to the surfaces and subsurfaces thereof desirable properties. More particularly, this invention relates to a new method of producing extremely hard and durable surfaces on iron and steels by causing a particular substance or substances to penetrate and diffuse into the base metal. The method of this invention is particularly suitable for effective treatment of machine and tool parts which are subjected to highly deteriorating conditions such as high abrasion, high external stresses, high heat, and corrosion and of precision machinery parts which are required to maintain dimensional precision over long periods of time.

Various methods have heretofore been practiced to provide protection of such machine and tool parts. For example, substantial progress has been made in powder metallurgy by the sintering method, particularly for high-speed cutting tools, and in the use of oxide sintered materials, such as alumina, for so-called ceramic tools. Articles made by this sintering method, however, have the disadvantage of being brittle and requiring high skill in handling effectively.

Cementation or carburizing and cladding parts with hard substances are some other known methods, but these have not been entirely satisfactory, principally because of the difficulty of suitably combining the properties of hardness and toughness.

An ideal machine or tool part of the kind being considered herein appears to be one having an extremely hard outer surface and a tough core material, with a sub-surface region therebetween wherein a gradual transition of hardness exists.

It is an object of the present invention to provide a new and economical method of treating certain iron and steel articles whereby the said articles are caused to have extremely hard and durable surfaces and tough inner cores with gradually decreasing hardness in the subsurface regions from surfaces to inner cores.

It is another object of the invention to provide such a method as stated above which can be modified to produce different surface and subsurface properties of the said iron and steel articles to suit the configuration and intended use of the said articles.

The ultimate object of the invention is to provide an economical method as stated above whereby such properties as wear-resistance, compression-resistance, heat-resistance, and corrosion-resistance are greatly improved in the said articles, thereby increasing their serviceable life and overall operational economy.

The foregoing objects and other objects of the present invention have been achieved by the present invention, which briefly stated comprises treating, at elevated temperatures and in an inert or reducing atmosphere, iron or steel plates, rolls, or machine part materials of various configurations in a penetrating and diffusing agent composed principally of tungsten carbide, titanium carbide, or molybdenum carbide; metallic titanium or molybdenum powder; and ammonium molybdate or ammonium tungstate and thereby causing such elements as tungsten and titanium to pentrate into the surfaces of the said articles of iron or steel.

The purity and grain size of the penetrating and diffusing agents to be used in the method of this invention and the heating temperature and time of the treatment by the penetrating and diffusing agent are important factors in the practical realization of the present method, but these factors are modifiable by certain degrees depending on such conditions as use and configuration of each material to be treated. In any case, an article to be treated by the present method is submerged in a penetrating and diffusing agent in powder form; is heated for a number of hours at a temperature of 850° C. to 1,100° C. in a furnace into which a reducing or inert gas (nitrogen, hydrogen, or carbon dioxide gas) is sent, or in which the said gas is circulated; and is then cooled to obtain the desired product.

The nature of the invention will be more clearly apparent by reference to the following examples of typical procedure, some results of which are indicated in the accompanying illustrations in which:

FIG. 1 is a graphical representation indicating the variation of hardness of the article of Example 1 with the position relative to the surface thereof;

FIG. 4 is a graphical representation indicating the variation of hardness of the article of Example 3 with the position relative to the surface thereof;

*Example 1.—Treatment of Various Metal Dies*

The composition of the penetrating and diffusing agent to be used in the instant treatment is as follows:

| | Parts by Weight |
|---|---|
| Tungsten carbide (WC) | 10 |
| Titanium carbide (TiC) | 2 |
| Cobalt (Co) | 2 |
| Para-ammonium tungstate | 1~5 |
| Ammonium molybdate | 1~5 |
| Copper (Cu) | 0.005 (max.) |
| Magnesium (Mg) (for reducing and activating the reaction) | 0.005 (max.) |

First, the base material to be treated is thoroughly annealed. It is then rough machined. Next it is subjected to low-temperature annealing (below the transformation temperature), then machined to a grinder finish.

This material is submerged in a powder mixture of the above-described impregnating agent and heated in a furnace for six hours at a temperature of 1,050° C. to 1,100° C., after which it is furnace cooled (at a cooling rate of 100° C. per hour) to prevent the retention of any internal thermal stresses due to the preceding heating step. Then the material is subjected to a heat treatment suitable for the base material.

Dies treated in the above-described manner have been found to exhibit serviceable lives which are 10 to 200 times that of die steel S.A.E. designation D–2,3, air or oil quenched (at 1,030° C. or 980° C.) and tempered at 200° C. The surface hardness of these dies treated according to this invention have been found to be as high as 1,380 Vickers micro-hardness, with 300-gram load, as tested by the Ernst Leitz Durimet micro-hardness tester.

Figure 5:
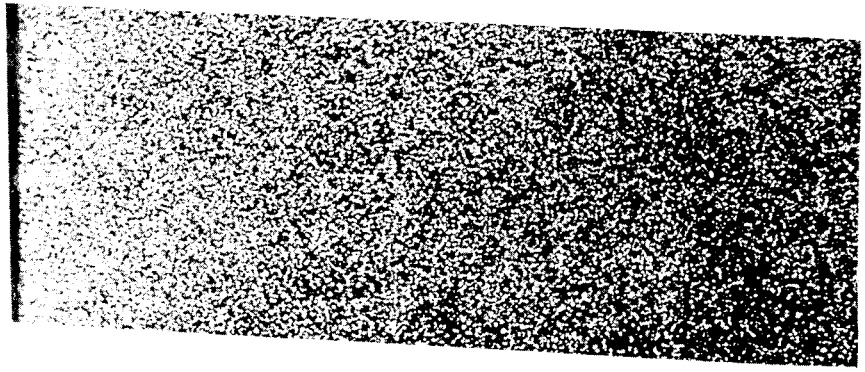
FIG. 5 is microscopic photographs showing the penetrated and diffused layer from the surface to the core material of the article of Example 3.
Figure 2:
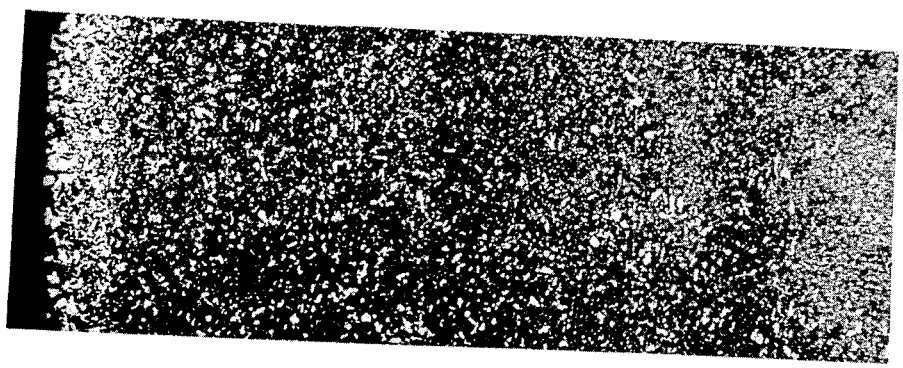
FIG. 2 is a microscopic photograph showing the penetrated and diffused layer from the surface to the core material of the article of Example 1.
Figure 6:
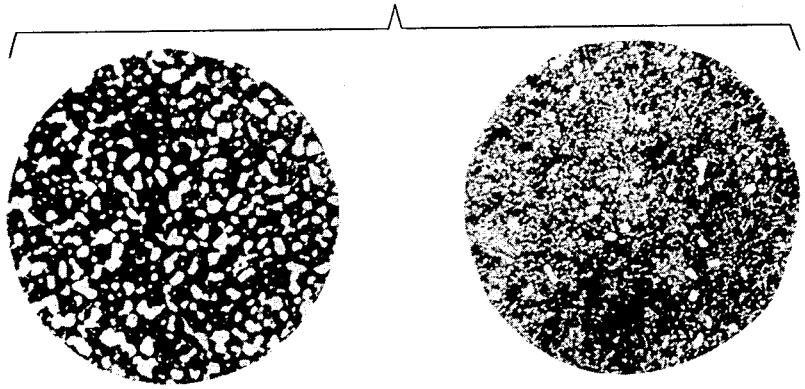
FIG. 6 are enlarged microscopic photographs showing the surface and core material of the article of Example 3.
Figure 3:
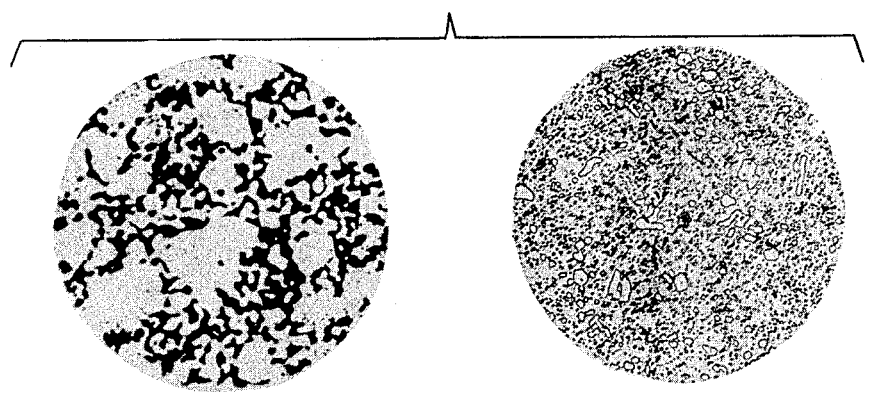
FIG. 3 are enlarged microscopic photographs showing the surface and the core material of the article of Example 1.

The distribution of hardness from surface to core material in the case of a typical die treated according to the method of the present invention is shown in FIG. 1. The structure of this die from surface to core material is shown in the microscopic photograph (magnification: 100 times) of FIG. 2. FIG. 3 is an enlarged photograph (magnification: 400 times) of the surface layer and of the core material. The base metal of the die illustrated in FIGS. 1 through 3 was die steel of high-carbon and high-chromium composition (equivalent to S.A.E. designation D-2) for cold working.

*Example 2.—Treatment of Flat Shear Blades and Circular Cutters of Gang Slitters and Trimmers*

The procedure for treating these articles is the same as that described in Example 1.

Blades so treated according to the present invention have been found to withstand 100,000 to 120,000 cuts before requiring regrinding. In comparison, similar blades made of die steel and quenched and tempered in the ordinary manner withstand only 8,000 to 12,000 cuts before regrinding (on the basis of burr-height limit of 20 microns).

It has been found, furthermore, that blades treated according to this invention can be reground by removing only one tenth of the regrinding volume which must be removed in reconditioning ordinary blades of the same type.

*Example 3.—Treatment of Bearing Rollers*

Most ordinary bearing rollers are made of high-carbon, low-chromium steels (equivalent to A.I.S.I. designation E52100), although this material cannot be said to be the optimum for the instant treatment. Treatment of this base metal by the same method as described in Example 1 produces a surface hardness between (m) HV 1100 and 1200 (200-gram load). The variation of the hardness with distance from the surface is shown graphically in FIG. 4.

*Example 4.—Treatment of Forming Rolls*

The instant treatment has been found to be extremely effective when applied to cold-working rolls used during the forming of such materials as conduit tubes and light-gauge steel shapes.

The composition of a penetrating and diffusing agent suitable for treatment of such rolls is as follows:

| | Parts by weight |
|---|---|
| Tungsten carbide (WC) | 10 |
| Titanium carbide (TiC) | 1 |
| Ti powder | 0.1 |
| Para-ammonium tungstate | 3 |
| Ammonium molybdate | 3 |
| Zinc powder (for reduction) | 0.005 |

The roll is treated with the above agent for 20 hours at a treatment temperature of 1,050° C. to 1,100° C.

As a result of this treatment, the surface hardness of a roll is increased to as high as (m) HV 1,280, and the serviceable life of the roll is consistently caused to be five or more times that of a roll made of ordinary heat-treated die steel.

*Example 5.—Treatment of Wear-Resisting Parts of Machines*

The composition of a penetrating and diffusing agent suitable for treatment of most wear-resisting parts of machines is as follows:

| | Parts by weight |
|---|---|
| Tungsten carbide (WC) | 10 |
| Molybdenum carbide (Mo$_2$C) | 3 |
| Cobalt powder | 2 |
| Para-ammonium tungstate | 3 |
| Aluminum powder (for reduction) | 0.005 |

The machine part is treated with the above agent for 6 to 10 hours at a temperature of 1,050° C.

Examples of machine parts for which the above-described treatment has been found to be effective are as follows: cams, plungers, pins, guide posts, guide rollers, liners, bushings, and various gauges.

*Example 6.—Treatment of Hot-Working Alloy Tool Steels and Austenitic Stainless Steel*

Alloy tool steels commonly used for such hot-working processes as forging are of chromium-vanadium-tungsten type or the chromium-molybdenum-vanadium type, typical compositions being as follows:

| Japanese Industrial Standards designation | Unit, percent | | | | | | |
|---|---|---|---|---|---|---|---|
| | C | Si (max.) | Mn (max.) | Cr | Mo | V | W |
| SKD-4 | 0.25-0.35 | 0.40 | 0.60 | 2.00-3.00 | | 0.30-0.50 | 5.00-6.00 |
| SKD-5 | 0.25-0.35 | 0.40 | 0.60 | 2.00-3.00 | | 0.30-0.50 | 9.00-10.00 |
| SKD-6 | 0.35-0.40 | 0.80-1.10 | 0.25-0.50 | 5.00-5.50 | 1.20-1.50 | 0.40-0.60 | |
| SKD-61 | 0.35-0.40 | 0.80-1.10 | 0.25-0.50 | 5.00-5.50 | 1.20-1.50 | 0.90-1.10 | |

Hot-working (forging) tools of such a composition can be effectively treated with a penetrating and diffusing agent of the following composition.

| | Parts by weight |
|---|---|
| Titanium powder | 10 |
| Cobalt powder | 5 |
| Titanium carbide (TiC) | 0.5 |
| Tungsten carbide (WC) | 0.1 |
| Ammonium molybdate | 3 |
| Zirconium powder | 0.5 |
| Niobium powder | 0.010 |

The tool is treated for 10 hours at a temperature of 1,100° C. It is then heat-treated at a quenching temperature of 1,030° C. and at a tempering temperature of 600° C. (30 minutes per square inch).

In the case of a base metal of a chromium-molybdenum-vanadium alloy steel (J.I.S. designation SKD-6), a surface hardness of approximately 1,040 (m) HV, with 300-gram load, is obtained through the treatment.

Furthermore, it has been found that, as a result of a thermal shock (cycle) test on the above-mentioned steel, no cracks were observable after 21 cycles of rapid heating to 600° C. and abrupt water cooling to 400° C.

It has also been found that a treatment similar to that described above imparts wear-resistance to austenitic stainless steels by increasing their surface hardnesses without having any detrimental effect on their corrosion-resistant property. In a typical case, austenitic stainless steel (J.I.S. designation SUS-27, equivalent to A.I.S.I. type 304) was found to have a surface hardness of approximately 550 (m) HV, with 200-gram load, after the instant treatment.

*Example 7.—Treatment of Working Roll of Sendzimir Mill*

Alloy steels suitable for such rolls ordinarily include chromium, molybdenum, and vanadium as indicated in the following partial table of typical compositions.

| Composition | Unit, percent | | | |
|---|---|---|---|---|
| | C | Cr | Mo | V |
| a | 1.5 | 12.0 | 1.2–1.5 | 0.5 |
| b | 2.5 | 13.0 | 1.2–1.5 | 0.5 |

The composition of a penetrating and diffusing agent suitable for treating such articles is as follows:

Parts by weight
Tungsten carbide (WC) _____ 10
Molybdenum carbide ($Mo_2C$) _____ 1
Titanium carbide (TiC) _____ 0.5
Tantalum carbide (TaC) _____ 0.5
Cobalt powder _____ 2
Para-ammonium tungstate _____ 2
Ammonium molybdate _____ 2

The roll is treated with the above agent for 80 to 100 hours at a temperature of 1,050° C.

A roll treated in the above-described manner has been found to have a surface hardness of 70 to 71, Rockwell C hardness and (m) HV 1,380, Micro-Vickers hardness. The penetration of the diffusing agent was found to be from 1 mm. to 2 mm.

The results of a comparative test, wherein the thickness reductions were 0.3 to 0.15 mm. for the first pass, 0.15 to 0.07 mm. for the second pass, and 0.07 to 0.02 mm. for the third pass, are presented in the following table.

| Item description | Hardness Rockwell C | Wear Resistance | Wear Condition After— | | | Quantity of Si Steel Sheet Rolled |
|---|---|---|---|---|---|---|
| | | | 1st Pass | 2d Pass | 3rd Pass | |
| Work roll made of die steel, heat-treated. | 63–64 | Not very good. | Slightly scored. | Unusable. | | 70 kg. (weight). |
| Work roll treated according to invention. | 70–71 | Good | (None) | (None) | Slightly scored. | 700 kg. (weight). |

Furthermore, it has been found that the above-described roll treated according to the invention is capable of producing bidirectionally oriented core sheets of 0.02 mm. thickness.

*Example 8.—Treatment of Parts of High-Pressure Oil Pumps*

Such parts of high-pressure oil pumps are commonly made of the following base metals.

(a) High-carbon, low-chromium steel (bearing material).
(b) Medium carbon, medium molybdenum steel (hot-working die steel).

A penetrating and diffusing agent suitable for treatment of the above-mentioned steels has the following composition.

Parts by weight
Tungsten carbide (WC) _____ 10
Titanium carbide (TiC) _____ 1
Boron carbide (BC) _____ 0.5
Nickel powder _____ 0.1
Zirconium carbide (ZrC) _____ 0.5
Ammonium molybdate _____ 2
Copper powder _____ 0.005
Cobalt powder _____ 0.5

The pump part is treated with the above agent for 8 to 10 hours at a temperature of 1,050° C. to 1,100° C.

It has been found that such a treatment is extremely effective in increasing the wear-resistance of such pump parts. The results of a comparative test in the case of valve seats of identical configuration but different material or treatment are presented below.

Conditions of test:
Pressure _____ kg./cm.$^2$__ 150–350
Power _____ horsepower__ 8
Rotational speed _____ r.p.m.__ 1,800
Duration of each test run _____ hours__ 500

| Valve Seat Base Material and Treatment | Wear Measured From Surface (mm.) |
|---|---|
| Cr-Mo Steel, carburized, quenched, and tempered | 0.05 |
| Ni-Cr-Mo Steel, carburized, quenched, and tempered | 0.025 |
| Bearing steel, high C, low Cr, quenched and tempered | 0.020 |
| Bearing steel, high C, low Cr, treated by method of the present invention | 0.0001 |

*Example 9.—Treatment of Cold-Working Tools*

A typical base material for such tools is high-carbon (1.4%), high-chromium (12%) alloy steel containing 1.5% Mo and 0.5% V.

A penetrating and diffusing agent suitable for such a steel is of the following composition.

Parts by weight
Titanium carbide (TiC) _____ 10
Tungsten carbide (WC) _____ 2
Cobalt powder _____ 1
Boron carbide (BC) _____ 0.1
Ammonium molybdate _____ 0.5
Ammonium tungstate _____ 0.5

The tool is treated with the above agent for 20 to 30 hours at a temperature of 1,080° C. After furnace cooling, the tool is heat treated at the heat-treatment temperatures of the base material, that is, oil quenched at 980° C. and tempered at 200° C. in the case of the aforementioned typical base material.

Microscopic examination of tools subjected to the above-described treatment reveals surface structures similar to that of tungsten carbide (sintered surface) and cores of martensitic structure.

The results of a comparative test in the case of a die steel punch for cold-forming Ni-Cr-Mo steel of HB 190 hardness are presented below.

| Tool | Hardness, Rockwell C | Relative Serviceable Life |
|---|---|---|
| Die steel punch, quenched and tempered | 61–62 | 1 |
| Die steel punch, treated according to the invention, quenched and tempered | 70–71 | 10 |

While particular embodiments of the present invention as exemplified by the foregoing examples have been described, it will be understood, of course, that the invention is not intended to be limited thereto, since many modifications can be made, and, therefore, it is contemplated by the appended claims to cover all such modifications as fall within the true spirit and scope of the invention.

What is claimed is:
1. A process of hardening steel articles by a penetra- tion treatment, which comprises heating said steel articles at a temperature of from 850° C. to 1100° C. in contact with a penetrating and diffusing agent in powder form consisting essentially of a carbide selected from the group consisting of tungsten carbide, titanium carbide, molybdenum carbide, boron carbide, zirconium carbide, tantalum carbide and mixtures thereof, a metal in powder form selected from the group consisting of molybdenum, titanium, cobalt, nickel, copper, zirconium, niobium, and mixtures thereof, and an ammonium salt selected from the group consisting of ammonium tungstate, ammonium molybdate, para ammonium tungstate, and mixtures thereof, thereby causing the metallic components of said agent to penetrate and diffuse into the surface and subsurface regions of said steel articles.

2. A process of hardening steel articles of steel by a penetration treatment, which comprises heating said steel articles at a temperature of from 850° C. to 1100° C. in contact with a penetrating and diffusing agent in powder form consisting essentially of a carbide selected from the group consisting of tungsten carbide, titanium carbide, molybdenum carbide, boron carbide, zirconium carbide, tantalum carbide and mixtures thereof, a metal in powder form selected from the group consisting of molybdenum, titanium, cobalt, nickel, copper, zirconium niobium, and mixtures thereof, a reaction-aiding metal selected from the group consisting of zinc, aluminum, magnesium, and mixtures thereof, and an ammonium salt selected from the group consisting of ammonium tungstate, ammonium molybdate, para ammonium tungstate, and mixtures thereof, thereby causing the metallic components of said agent to penetrate and diffuse into the surface and subsurface regions of said steel articles.

References Cited in the file of this patent

UNITED STATES PATENTS

| | | |
|---|---|---|
| 1,788,876 | Lamon | Jan. 13, 1931 |
| 1,943,171 | Folliet | Jan. 9, 1934 |
| 2,364,292 | Holt | Dec. 5, 1944 |
| 2,536,774 | Samuel | Jan. 2, 1951 |
| 2,887,420 | Llewelyn | May 16, 1959 |
| 3,029,162 | Samuel | Apr. 10, 1962 |